NED H. MOERKE,
CHARLES NEWMAN,
INVENTORS.

BY
ATTORNEY.

United States Patent Office 2,707,033
Patented Apr. 26, 1955

2,707,033

PULSATION DAMPENERS

Ned H. Moerke, Long Beach, and Charles Newman, Los Angeles, Calif., assignors to The Fluor Corporation, Ltd., Los Angeles, Calif., a corporation of California Application December 16, 1952, Serial No. 326,216

14 Claims. (Cl. 181—48)

This invention has to do with improvements in gas pulsation dampeners applicable in various installations for the elimination or reduction of mechanically created pulsations or surges in gas streams. Among the principal uses of the present type of dampener is its installation at either or both the intake and discharge sides of one or more piston-type gas compressors, so that the function of the dampener or dampeners may be to reduce or eliminate the compressor created pressure impulses in the intake gas stream going to the compressors, or in the high pressure gas stream at the discharge side.

The invention may be more particularly characterized as relating to improvements in the type of pulsation dampeners dealt with in the Stephens Patents No. 2,405,100, issued July 30, 1946, on "Pulsation Elimination in Gas Lines" and No. 2,437,446, issued March 9, 1948, on "Gas Pulsation Dampening Apparatus." Generally considered, such dampeners involve the combination of a pair of capacitance chambers interconnected by a pipe forming a relatively restricted and elongated inductance passage, and one or more gas inlets and outlets so related to the capacitance chambers and inductance passage that the gas flows through the latter in passing from the inlet to the outlet and is in pressure transmitting communication with the capacitance chambers at opposite ends of the inductance passage. In certain of its more specific aspects, the invention is particularly concerned with improvements in the type of dampening structure disclosed in the Stephens Patent No. 2,437,446, wherein the capacitance chambers are contained within a unitary elongated shell structure containing the interconnecting induction passage-forming pipe, the length of which is greater than the length of the shell structure. The design of all such dampeners involves consideration of various factors including the volumes of the capacitance chambers, the dimensions of the interconnecting induction passage, the velocity of sound in the gas, and the pulsation frequency of the pressure surges to be removed from the gas stream. Utilization of these factors in the dampener design are fully dealt within the Stephens patents and require no further discussion herein.

It is found that in some instances or installations, operating conditions of a variational or unpredictable nature may interfere with the theoretically proper performance of the dampener as predicated upon relatively certain and stable prescribed or assumed operating conditions. For example, operating conditions may produce variances in the gas pulsation frequency, and composition or pressure of the gas, with resultant loss in the pulsation eliminating efficiency of the dampener.

One of our primary objects is to increase the performance range and pulsation removing efficiency of the dampener, in a manner that will tolerate substantial variances in operating conditions, or variances between a given set of operating conditions and those for which the dampener is specifically designed, without appreciable performance loss. Generally speaking, this improvement is predicated upon the provision of one or a pair of side branch acoustically resonant chambers in pressure transmitting communication with one or both of the dampener capacitance chambers, as the requirements of a given installation may dictate. It is particularly contemplated that one or a pair of such resonant side chambers may be incorporated in and as a part of the same shell structure as that forming the unitized capacitance chambers. Thus as will appear, where, as is in this type of dampener, the capacitance chambers may be formed by partitioning an elongated cylindrical shell, the supplementary side branch resonance chambers may be incorporated in the same shell structure either beyond or between the capacitance chambers. Accommodation of the side branch chambers in this manner has the advantage beyond economizing and simplifying the overall dampener construction, of minimizing the induction of mechanical resonance in the capacitance chamber shell by reason of the integration therewith of the supplementary dampening side branch chambers.

All the various features and objects of the invention as well as details of certain typical and illustrative embodiments, will be understood more fully from the following description of the accompanying drawing, in which.

Figure 1:
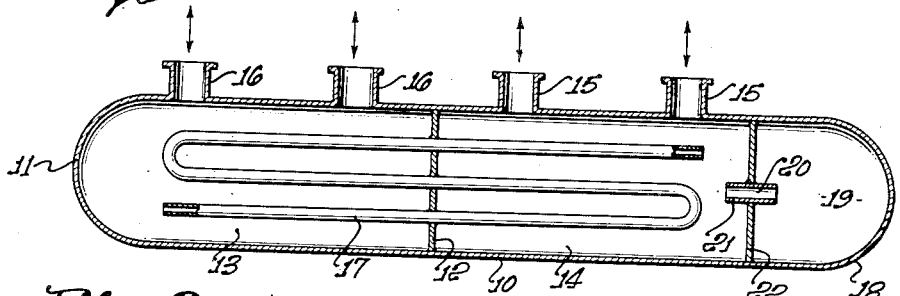
Fig. 1 is a view showing in longitudinal cross-section one form of the invention employing a single side chamber as an integrated end portion of the dampener shell.

Referring first to Fig. 1, the body of the dampener is shown to comprise an elongated cylindrical shell 10, one end of which may be closed at 11, the shell containing a transverse plate or partition 12 dividing the shell interior into a pair of preferably equal volume capacitance chambers 13 and 14. The pulsating gas stream or streams may be delivered to one of the chambers, e. g. 14, through inlets 15 connectible with one or a pair of gas compressors, the gas leaving chamber 13 through one or more outlets 16. Depending upon the pulsative condition of the gas in the respective chambers 13 and 14, the connections 15 and 16 may serve respectively as inlets or outlets to pass the gas into chamber 13 and then into chamber 14, or reversely as circumstances may require. The two capacitance chambers are interconnected by an elongated pipe 17 forming a restricted acoustical inductance passage, the pipe being of greater length than the shell structure and being extended through the partition 12 and doubled upon itself for accommodation within the axial dimensions of the capacitance chambers.

In Fig. 1, the extended and closed end portion 18 of the shell forms a chamber 19 in the nature of an acoustically resonant side branch zone in communication with the capacitance chamber 14 through one or more restricted passageways, typically restricted opening 20. As will be understood, the latter permits restricted transmission of gas pulsations in chamber 14 into the closed chamber 19, causing the latter to assume an acoustically resonant condition creative of return pressure effects tending to modulate or compensate the pulsative atmosphere in chamber 14. Preferably the restricted opening 20 is contained within a short length of pipe 21 centrally positioned in partition 22 separating the chambers 14 and 19. At this point it may be mentioned that the volume of the chamber 19 may be calculated in accordance with the formulations applying to the side branch acoustical system disclosed in Stephens Patent No. 2,474,553, issued June 28, 1949, on "Elimination of Pulsations in Gas Lines."

Figure 2:
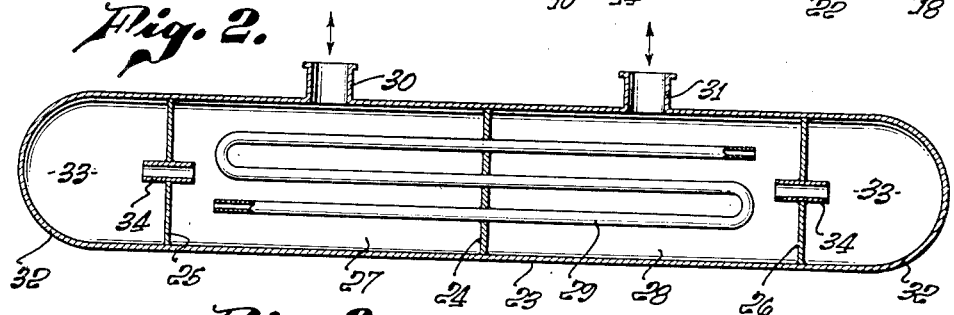
Fig. 2 is a view similar to Fig. 1 showing the use of two side chambers at opposite ends of the shell.

Fig. 2 illustrates a dampener essentially similar to the Fig. 1 embodiment, except that side branch chambers are here provided in association with each of the capacitance chambers. Shell 23, partitioned at 24, 25 and 26 to form the capacitance chambers 27 and 28, contains the elongated induction passage pipe 29 interconnecting the chambers for series flow of the gas between the inlet or outlet connections 30 and 31. The closed end portions 32 of the shell form beyond partitions 25 and 26 the closed side branch chambers 33 communicating respectively with chambers 27 and 28 through the restricted passages contained within the short pipes 34. Here the chambers 33 successively supplement the acoustical effects of the capacitance chambers as the gas flows serially therethrough.

Figure 3:
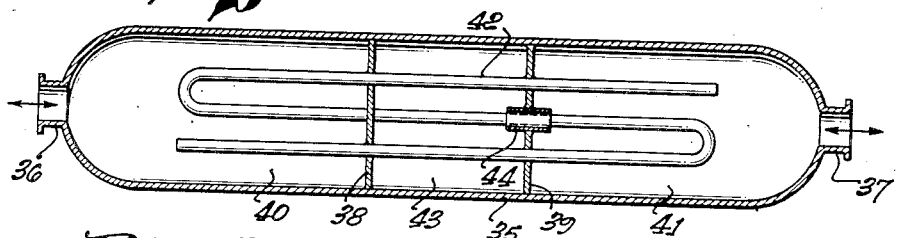
Fig. 3 illustrates a variational form of the invention employing a single side branch chamber interposed between the two capacitance chambers.

In the form of the invention shown by Fig. 3, the dampener shell 35 has at its opposite ends the gas inlet and outlet 36 and 37, and contains a pair of intermediate partitions 38 and 39 dividing the shell into equal volume capacitance chambers 40 and 41 interconnected by the elongated induction passage pipe 42 extending through both partitions. Here the acoustical side branch chamber 43 is contained within the shell between partitions 38 and 39 and has restricted communication with chamber 41 through pipe 44.

Figure 4:
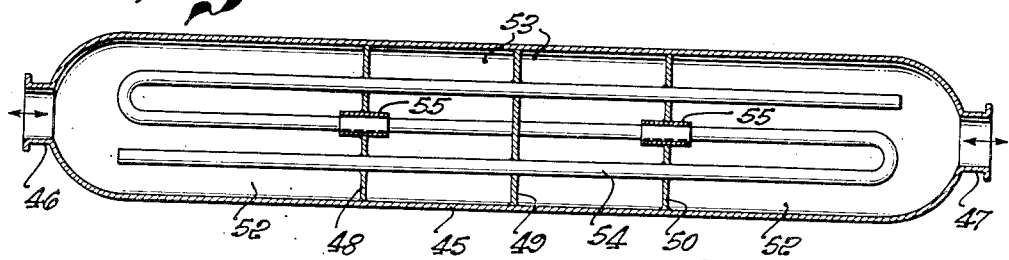
Fig. 4 is a view similar to Fig. 3 showing a pair of side branch chambers contained in the shell between the capacitance chambers.

Fig. 4 illustrates a further variational form of the invention in which the shell 45 having an end inlet 46 and outlet 47, contains three partitions 48, 49 and 50 separating the shell into the equal volume capacitance chambers 52 and intermediate side branch chambers 53. Chambers 52 are interconnected by the elongated open end pipe 54 which is extended through all three partitions 48 to 50. Chambers 53 serve as acoustical side branch adjuncts to the capacitance chambers 52, by their restricted communications therewith through pipe 55.

We claim:

1. A gas pulsation dampener comprising an elongated shell structure, means dividing the shell interior into a pair of separate acoustical capacitance chambers the first having a gas inlet and the second a gas outlet, the gas having open flow through the inlet into said first chamber and open flow from the second chamber through the outlet, an elongated relatively restricted induction passage pipe interconnecting said chambers, said pipe having open ends within the chambers and being substantially imperforate between said ends, and an acoustically resonant side chamber having a restricted communication with one of said capacitance chambers but otherwise being closed.

2. A pulsation dampener as defined in claim 1, in which said restricted communication is a short length pipe.

3. A pulsation dampener as defined in claim 1, in which said pipe has greater length than the combined length of the capacitance chambers.

4. A pulsation dampener as defined in claim 1, in which said elongated pipe is contained entirely within said capacitance chambers.

5. A gas pulsation dampener comprising an elongated shell structure, means dividing the shell interior into a pair of separate acoustical capacitance chambers the first having a gas inlet and the second a gas outlet, the gas having open flow through the inlet into said first chamber and open flow from the second chamber through the outlet, an elongated relatively restricted induction passage pipe interconnecting said chambers, said pipe having open ends within the chambers and being substantially imperforate between said ends, and a pair of acoustically resonant side chambers having restricted communications respectively with said capacitance chambers but otherwise being closed.

6. A pulsation dampener as defined in claim 1, in which all of said chambers are formed by the same integrated cylindrical shell structure.

7. A pulsation dampener as defined in claim 5, in which all of said chambers are formed by the same integrated shell structure.

8. A gas pulsation dampener comprising an elongated shell structure forming a pair of separate acoustical capacitance chambers the first having a gas inlet and the second a gas outlet, the gas having open flow through the inlet into said first chamber and open flow from the second chamber through the outlet, an elongated relatively restricted induction passage pipe interconnecting said chambers, said pipe having open ends within the chambers and being substantially imperforate between said ends, a wall separating the chambers and through which said pipe extends, and an acoustically resonant chamber at the end of one of said chambers opposite said wall and having a restricted communication with the chamber but otherwise being closed.

9. A gas pulsation dampener comprising an elongated shell structure forming a pair of separate acoustical capacitance chambers the first having a gas inlet and the second a gas outlet, the gas having open flow through the inlet into said first chamber and open flow from the second chamber through the outlet, an elongated relatively restricted induction passage pipe interconnecting said chambers, said pipe having open ends within the chambers and being substantially imperforate between said ends, a wall separating the chambers and through which said pipe extends, and a pair of acoustically resonant chambers at the ends of said capacitance chambers opposite said wall and having restricted communications therewith but otherwise being closed.

10. A gas pulsation dampener comprising an elongated shell structure forming a pair of separate acoustical capacitance chambers the first having a gas inlet and the second a gas outlet, the gas having open flow through the inlet into said first chamber and open flow from the second chamber through the outlet, a relatively restricted induction passage pipe interconnecting said chambers, said pipe having open ends within the chambers and being substantially imperforate between said ends, an acoustically resonant chamber between said capacitance chambers and closed except for a restricted communication with one of the capacitance chambers.

11. A gas pulsation dampener as defined in claim 10, in which said pipe extends through said resonant chamber.

12. A gas pulsation dampener comprising an elongated shell structure forming a pair of separate acoustical capacitance chambers the first having a gas inlet and the second a gas outlet, the gas having open flow through the inlet into said first chamber and open flow from the second chamber through the outlet, a relatively restricted induction passage pipe interconnecting said chambers, said pipe having open ends within the chambers and being substantially imperforate between said ends, and a pair of acoustically resonant chambers between said capacitance chambers and closed except for individual restricted communications respectively with the capacitance chambers.

13. A gas pulsation dampener as defined in claim 12, in which said pipe extends through both of said resonant chambers.

14. A gas pulsation dampener comprising an elongated cylindrical shell forming a pair of capacitance chambers the first having a gas inlet and the second a gas outlet, the gas having open flow through the inlet into said first chamber and open flow from the second chamber through the outlet, a partition in the shell separating said chambers, an elongated relatively restricted induction passage pipe interconnecting said chambers through the partition and having greater length than the combined lengths of the chambers, said pipe having open ends within the chambers and being substantially imperforate between said ends, a third chamber formed by the shell directly beyond one of said capacitance chambers, and a second partition in the shell separating said third chamber and containing a restricted opening through which said third chamber has gas surging communication with the adjacent capacitance chamber, the third chamber otherwise being closed.

References Cited in the file of this patent

UNITED STATES PATENTS

| | | |
|---|---|---|
| 2,070,543 | Cary et al. | Feb. 9, 1937 |
| 2,468,384 | Tyskewicz | Apr. 26, 1949 |
| 2,501,794 | Stephens | Mar. 28, 1950 |
| 2,513,229 | Bourne et al. | June 27, 1950 |
| 2,624,418 | Bourne | Jan. 6, 1953 |